Feb. 15, 1955

M. PALO ET AL 2,702,317

REVERSIBLE STYLUS MOUNTING FOR
PHONOGRAPH PICKUP CARTRIDGES

Filed June 3, 1953

2 Sheets-Sheet 1

INVENTOR
MAURICE PALO
PAUL V. KELLY

BY

Francis J. Klempay

ATTORNEY

INVENTOR
MAURICE PALO
PAUL V. KELLY

BY Francis J. Klempay
ATTORNEY

United States Patent Office 2,702,317

Patented Feb. 15, 1955

2,702,317

REVERSIBLE STYLUS MOUNTING FOR PHONOGRAPH PICKUP CARTRIDGES

Maurice Palo, Conneaut, Ohio, and Paul V. Kelly, West Springfield, Pa., assignors to The Astatic Corporation, Conneaut, Ohio, a corporation of Ohio Application June 3, 1953, Serial No. 359,260

14 Claims. (Cl. 179—100.41)

The present invention relates to improvements in electromechanical phonograph pick-up cartridges, particularly of the type utilizing piezoelectric transducing elements, and has particular reference to improvements in pick-up cartridges of the type intended for selective use in the so-called standard and micro-groove recording systems.

The primary object of the invention is the provision of a pick-up cartridge of an improved type wherein improved and novel means are provided for selectively conditioning the cartridge for use in either of the above mentioned recording systems.

It is now common practice to furnish phonograph sound reproducing apparatus which is adapted to accommodate any of several types of recording discs. That is, a modern conventional phonograph apparatus is commonly provided with a number of selectable turntable speeds, for example 78, 33⅓ and 45 R. P. M. And it is also common to provide with such apparatus a tone arm and pick-up cartridge assembly having a plurality of selectively usable record-engaging styli, one of approximately three mil tip radius for use in the standard system, and one of approximately one mil tip radius for use in the micro-groove recording systems. The present invention is concerned with improvements in pick-up cartridges so that common use thereof in the various systems may be more effectively and advantageously realized.

Heretofore it has been common practice to provide pick-up cartridges having a piezoelectric or other transducing element and a plurality of divergently related styli extending in fixed directions from the cartridge whereby upon suitable manipulation of the cartridge assembly as a whole any one of the plurality of styli might be presented in record engaging position. We have found this arrangement to have certain disadvantages which are avoided in the aparatus of the present invention.

In connection with the above, it is a more specific object of this invention to provide a novel and improved phonograph pick-up cartridge assembly having a plurality of styli adapted for selective use wherein improved means are provided for manipulating the styli independently of other components of the pick-up cartridge.

Yet another object of the invention is the provision of an improved pick-up cartridge assembly wherein a plurality of styli may be manipulated independently of other parts of the assembly which is characterized by a novel and substantially improved arrangement for mounting and manipulating the styli. And in this respect the present invention constitutes an improvement over the invention shown and described in co-pending application Ser. No. 305,970 filed August 23, 1952, by Robert L. Mayer.

More specifically, the preset invention resides in an improved and simplified mounting and manipulating mechanism for pick-up cartridge assemblies of the type described which is inexpensive to manufacture and assemble and which is arranged to facilitate the replacement of worn styli whenever necessary.

The above and other objects and advantages of the invention will become apparent upon full consideration of the following detailed specification and accompanying drawing wherein are disclosed certain preferred embodiments of our invention.

Figure 2:
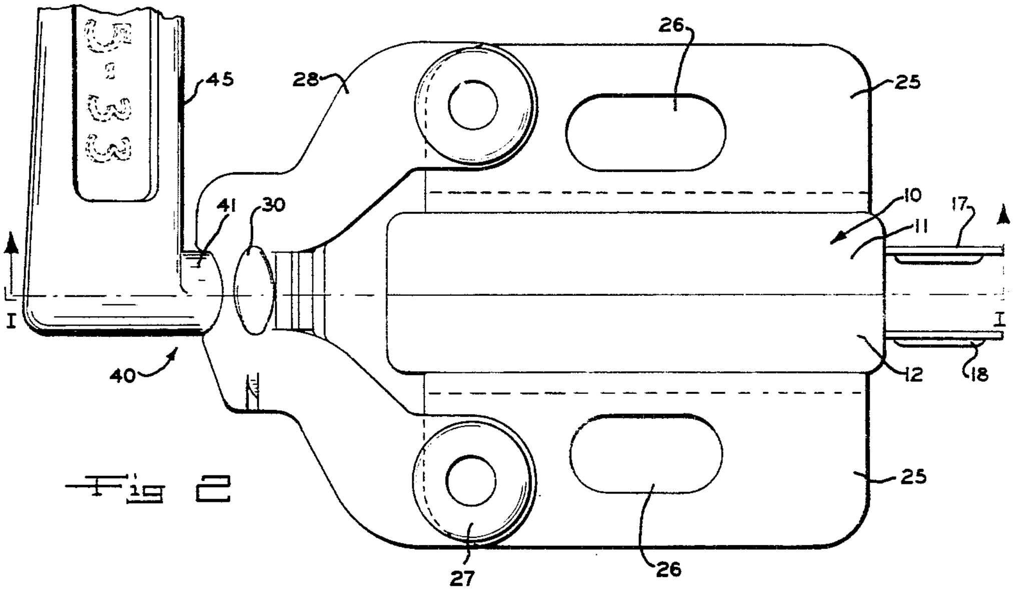
Figure 2 is a top plan view of the apparatus of Figure 1.

Referring now to the drawing, the reference numeral 10 designates, generally, a phonograph pick-up assembly comprising a pair of substantially symmetrical housing halves 11 and 12 which are provided with suitable recess means 15 and 16 for housing a conventional piezoelectric transducer element 13. In accordance with usual construction, a plurality of resilient clamping pads 20—24 are provided to resiliently mount the transducer or crystal element 13 within the housing 11—12. Terminal connectors 17 and 18 are also mounted in the housing halves 11 and 12, in contact with opposite terminals of the crystal element 13, and this is also in accordance with known pick-up cartridge construction. Suitable rivets 14, or other equivalent means, may be employed to secure the housing halves 11 and 12 in assembled relation.

Secured to the outer faces of the housing halves 11 and 12 we provide outwardly extending flanged mounting brackets 25, each having a slotted hole 26 formed therein in the manner shown in Figure 2. The brackets 25 provide convenient means for mounting the assembled pick-up cartridge in a conventional tone arm device, not shown, of a phonograph machine.

Attached to the brackets 25 by means of rivets 27, for example, and extending forwardly and downwardly therefrom is a first bearing member 28 which, in accordance with the teachings of the invention, is provided at its lower end with a downwardly opening U-shaped recess 28'. A second bearing member 31 is also provided, and this last mentioned member is secured to the lower side of the first bearing member 28 by means of a rivet 30. The second bearing member 31 is provided with a lower portion 31' which is offset inwardly from the first bearing member 28, and there is also formed in the second bearing member a downwardly opening U-shaped recess 31'' which is substantially identical to and aligned with the first mentioned recess 28'. As will be observed in Figure 5 both of the bearing members 28 and 31 are beveled along their right hand edge portions, at 35, for purposes which will hereafter become apparent.

Secured between the bearing members 28 and 31, by means of the rivet 30, is a spring member 32, a free end portion 32' of which extends across the lower sides of the U-shaped openings 28' and 31''. Preferably, the free end portion 32' of the spring is arranged to lie between the spaced bearing members 28 and 31. And the normal disposition of the portion 32' is substantially as indicated by the broken lines of Figure 5.

Figures 4, 5, 6, 7, 8, 9:
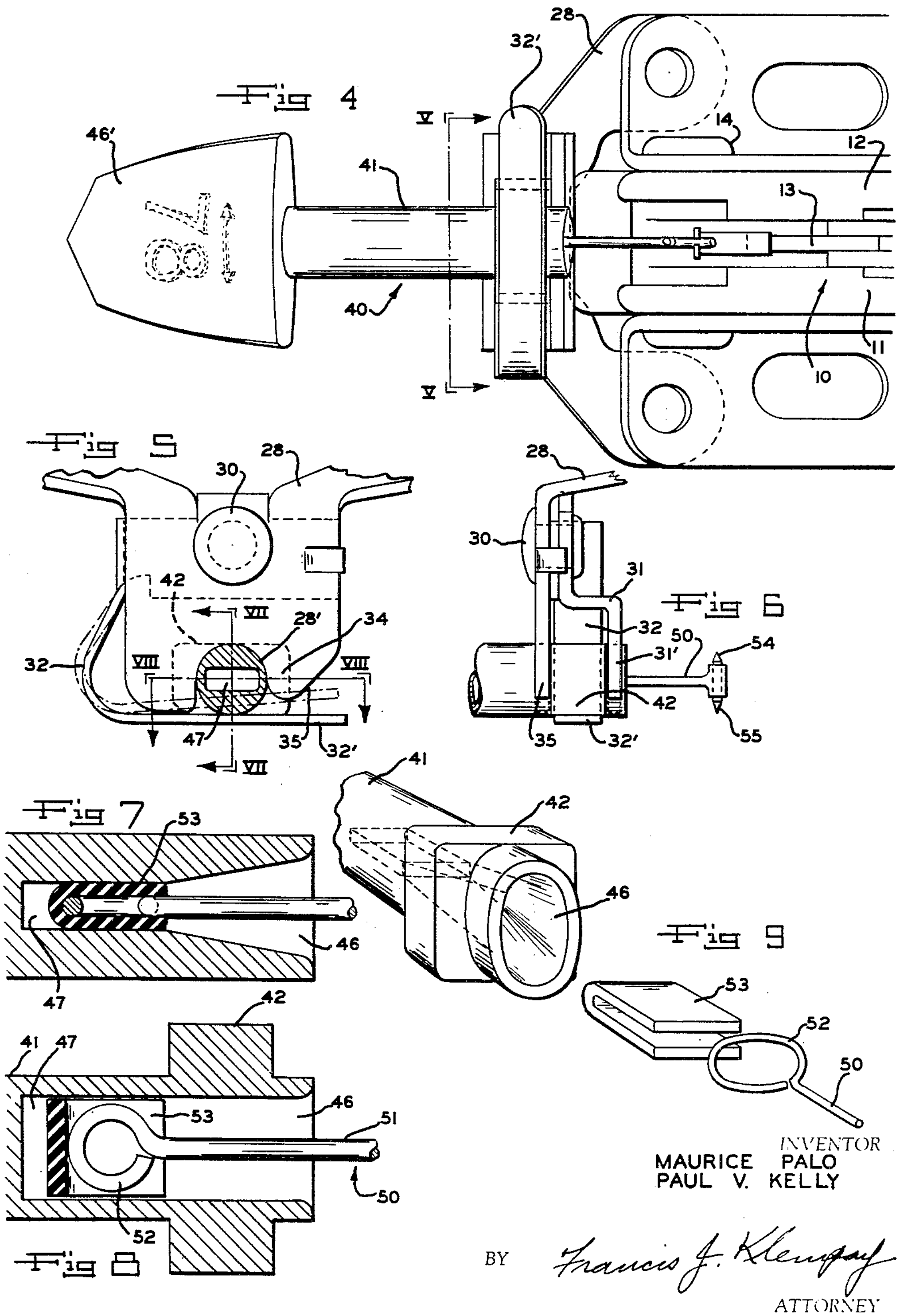
Figure 4 is an enlarged fragmentary bottom plan of a modified form of the apparatus of Figure 1.
Figure 5 is a fragmentary section view taken along line V—V of Figure 4.
Figure 6 is a fragmentary side elevation of the apparatus of Figure 4.
Figures 7 and 8 are fragmentary sectional views taken along lines VII—VII and VIII—VIII, respectively, of Figure 5.
Figure 9 is a fragmentary exploded view, in perspective, of the apparatus of Figures 1 and 4.

Received and journaled in the spaced U-shaped openings 28' and 31'', and retained therein by means of the spring 32, is the cylindrical shank portion 41 of a control member or device 40. The shank portion 41, in accordance with the teachings of the invention, is provided with an integral rectangular portion 42 which is arranged to be positioned between the bearing members 28 and 31. With the apparatus thus assembled, as shown in Figure 5 for example, the free end portion 32' of the spring 32 bears against one side of the rectangular portion 42, tending to retain the control member 40 in one or the other of two rotative positions wherein the major axis of the rectangular portion 42 is disposed in parallel relation to the free end portion 32'. Conventionally, the control member 40 is provided with a suitable lever 45 or knob 46', as shown in Figures 2 and 4, respectively, so that it may be readily grasped and manipulated. Also, it is conventional to provide suitable indicia on the control member 40 so that an operator may readily determine the rotative orientation thereof.

As illustrated in Figures 7–9 the control member 40 is provided internally with a recess 46 which is generally circular at its open end, and which is of rectangular cross section internally of the member 40, as at 47. Received within the recess portion 47 is a resilient pad 53, which is preferably a single strip of rubber, for example, which is folded into a U-shaped arrangement, opening outwardly of the recess 46.

Figure 1:
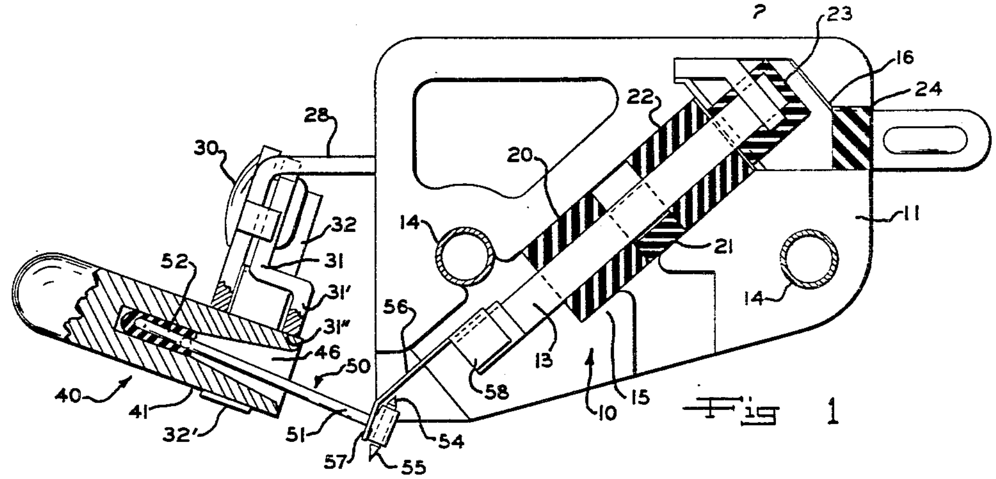
Figure 1 is a longitudinal section view, taken along line I—I of Figure 2, of a phonograph pick-up cartridge assembly constructed in accordance with the teachings of our invention.
Figure 3:
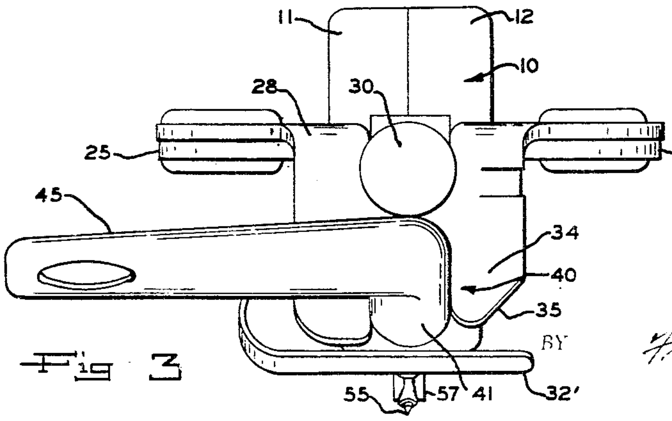
Figure 3 is a front elevation of the apparatus of Figure 1.

Received in the recess 46, within the fold of the resilient pad 53, is the generally circular eye portion 52 of a stylus mounting member 50, which mounting member is preferably formed of a length of suitable wire, including an elongated shank portion 51, substantially as shown in Figure 1. In accordance with the teachings of the invention the mounting member 50 carries at its outer or rearwardly projecting end a pair of oppositely disposed record engaging styli 54 and 55, of wear resisting metal or precious stone, each stylus being adapted for use in a particular recording system.

To afford a driving connection between the styli 54 and 55 and the crystal element 13 we have provided a driving member 56 of relatively thin metal strip which includes tab means 58 at its upper end for rigidly connecting the driving member to the crystal element, and a bifurcated lower end portion 57, constituting a journal portion, which is adapted to rotatably receive the shank portion 51 of the stylus mounting member at a point adjacent the styli 54 and 55. In accordance with the preferred practice of the invention the driving member 56 is of substantial thickness along an axis directed horizontally and transversely of the stylus mounting member 50 so as to faithfully transmit side-to-side movements of the styli 54 and 55 to the crystal element 13, while being of greatly reduced thickness in a generally vertical direction whereby considerable compliance in the driving member is afforded to absorb vertical movements of the styli. Thus, in the use of the apparatus in tracking a record groove, the side-to-side undulations of the groove are faithfully followed and transmitted to the piezoelectric member 13, while other undesirable contours of the groove are largely filtered out, providing unusually high fidelity performance.

It will be noted in Figure 1 that the rotative axis of the control member 40 intercepts the driving member 56 above the bifurcated lower end or journal portion 57 thereof. Thus, when the parts are in assembled relation the longitudinal axis stylus mounting member 50 is necessarily displaced from the rotative axis of the control member 40, against the restraining action of the resilient pad 53. The arrangement, in accordance with the teachings of the invention, is such that the resilience of the pad 53 not only serves to assist in retaining the stylus mounting member 50 in assembled relation with the driving member 56, but the member 50 is maintained under a predetermined resilient urging force so that undesirable vibrations are substantially minimized or wholly avoided. When the control member 40 is rotated to present a new stylus in downwardly disposed or record engaging position the axis of the mounting member 50 of course remains generally fixed, and this is provided for by the inherent resilience in all directions of the U-shaped pad 53. It will be noted, moreover, that in any operative orientation of the stylus mounting member 50 the terminal eye 52 thereof, as well as the pad 53 will be generally disposed transversely with respect to the crystal driving member 56 so that proper resilient tension is at all times applied to the mounting member 50.

To disassemble our apparatus, to replace worn styli for example, it is necessary merely to slip the free end portion of the mounting member 50 out of engagement with the journal portion 57 of the driving member 56, and to draw the control member 40 downwardly and laterally out of the U-shaped bearing recesses 28' and 31'' therefor, the spring portion 32' being sufficiently compliant for this operation. To facilitate this operation the open sides of the bearing members 28 and 31 i. e. the right hand sides as viewed in Figure 5, have been relieved to some extent to reduce the required downward withdrawing movement of the control member 40 required before the same may be withdrawn laterally from the assembly. Reassembly is effected by merely inserting a previously assembled mounting member and control member combination laterally into the open sides of the bearing members 28 and 31, and the beveled open side portions 35 of the bearing members 28 and 31 are designed to facilitate this operation as will be readily understood.

It should now be apparent that we have fulfilled the objects of our invention. Our apparatus affords a simple and wholly practical phonograph pickup assembly which is characterized by a novel arrangement for mounting a plurality of selectively usable styli in rotative relation to the crystal element and to other parts of the assembly so that the apparatus may be conditioned for selective use in either the standard or microgroove recording systems in a most simple and practical manner.

Our apparatus possesses many features of substantial novelty, such as, for example, the unique arrangement including recess 46 in the control member 40, resilient pad 53, and the bifurcated journal portion of the crystal driving member 56 for carrying the stylus holding member 50. The arrangement is such that the member 50 needs merely be inserted into the recess 46 and into the bifurcated lower end of the driving member 56, whereupon a resilient urging force imparted by the pad 53 operates to maintain the parts in assembled condition, and also to filter out many undesirable vibrations from the stylus holding member. The resilient urging force imparted by the pad 53 is effected by aligning the normal rotative axis of the control member 40 so as to intersect the driving member above the bifurcated lower end thereof, and by providing the stylus mounting member 50 with an eye 52, for example, which is disposed transversely with respect to the styli 54 and 55, the arrangement being such that when any stylus is in record engaging position the pad 53 is distored in such manner as to apply the desired urging force to the eye of the member 50. And it will be noted further that the U-shaped pad 53, the preferred form, has a minimum effect upon side-to-side movements of the stylus holding member 50, as when properly following a record groove.

In addition to the above, our arrangement for rotatably supporting the control member 40 is highly useful as well as simple and economical to manufacture. The entire bearing structure consists of a pair of spaced downwardly opening U-shaped recesses, the open ends of which are closed by the free end portion 32' of a simple spring mechanism so that while the control member may be readily inserted into and removed from the bearing means therefor, the former is securely retained for normal operation.

Spring 32 , in combination with an integral rectangular portion 42 of the otherwise generally cylindrical shank of the control member 40, serves additionally to releasably retain the stylus assembly in any preset operative position wherein one of the styli is disposed in record engaging position.

It should be understood, however, that the apparatus herein specifically shown and described is intended to be illustrative only, and reference should therefore be had to the appended claims in determining the true scope of the invention.

We claim:

1. A pickup cartridge assembly for electric phonograph apparatus comprising in combination a housing adapted to be secured in the outer free end of a phonograph tone arm, a piezo-electric transducer mounted in said housing and having a freely disposed portion adapted to be flexed for the generation of an electric potential, a driving member secured to and carried by said transducer and extending forwardly thereof, a stylus mounting member, means on said driving member constituting a journal portion to rotatably receive said stylus mounting member, a plurality of divergently related record groove engaging styli carried by said mounting member and spaced closely adjacent said driving member, means for anchoring said stylus mounting member at a point spaced forwardly of said journal portion, and means for rotating said stylus mounting member in said journal portion to selectively position any of said plurality of styli in record engaging position.

2. Apparatus according to claim 1 further characterized by said means to anchor comprising a rotatable control member.

3. Apparatus according to claim 2 further characterized by said rotatable control member having a generally cylindrical shank portion, means to rotatably mount said shank portion including a resilient member, and integral non-cylindrical areas on said shank portion disposed adjacent said resilient member, said non-cylindrical areas and said resilient member comprising detent means to releasably retain said control member in predetermined rotative positions.

4. Apparatus according to claim 3 further characterized by said control member having a recess therein for the reception of said stylus mounting member, resilient means in said recess for anchoring said mounting member therein, said control member being disposed along a rotative axis offset from said journal portion whereby said resilient means is normally maintained in a deformed condition.

5. A pickup cartridge assembly for electric phonograph apparatus comprising in combination a housing adapted to be secured in the outer free end of a phonograph tone arm, a piezoelectric transducer mounted in said casing and having a freely disposed portion adapted to be flexed for the generation of an electric potential, a driving member secured to and carried by said freely disposed portion, said driving member including means constituting a journal portion, a stylus mounting member rotatably carried by said journal portion and extending forwardly thereof, means to resiliently anchor the forward end portion of said mounting member, and means to rotate said anchor means.

6. Apparatus according to claim 5 further characterized by said stylus mounting member having an eye portion at its forward end, said journal portion comprising a downwardly opening recess in said driving member, said anchor means including resilient pad means positioned on each side of said eye portion and a rotatable member having a recess therein for receiving said pad means and said eye portion and disposed along a rotative axis intercepting said driving member above said journal portion.

7. Apparatus according to claim 5 further characterized by said means to rotate said anchor means comprising a rotatable control member having a cylindrical shank portion and integral non-cylindrical areas, means to rotatably support said control member including a spring member adapted to bear resiliently upon said non-cylindrical areas whereby to retain said control member in certain preset rotative positions.

8. In a pickup cartridge assembly of the type having a fixed housing and piezoelectric element, and a stylus mounting member rotatable with respect thereto, the combination of bearing means carried in fixed relation to said housing, said bearing means comprising spaced bearing members positioned forwardly of said housing and having aligned downwardly opening U-shaped recesses therein, a control member rotatably received in said recesses, a spring member carried in fixed relation to said housing and adapted to urge said control member upwardly into said recesses, said stylus mounting member having operative connection with said control member whereby rotation of said control member effects rotation of said mounting member.

9. Apparatus according to claim 8 further characterized by said spring member comprising an elongated transversely disposed free end portion positioned adjacent the open lower ends of said recesses, said bearing members being beveled upwardly adjacent the end of said free end portion.

10. Apparatus according to claim 8 further characterized by said control member having non-cylindrical areas adjacent said spring member, said areas and said spring member comprising detent means for releasably retaining said control member in any of a plurality of preset rotative positions.

11. In a pickup cartridge assembly of the type having a fixed housing and piezoelectric element, and a stylus mounting member rotatable with respect thereto, said stylus mounting member carrying a plurality of divergently related styli, the improvement which comprises a driving member secured to said piezoelectric element and having a downwardly opening recess therein to rotatably receive said stylus mounting member, and means to rotate said stylus mounting member including means to urge the latter upwardly into said recess, said means to rotate and means to urge being positioned forwardly of said piezoelectric element.

12. Apparatus according to claim 11 further characterized by said stylus mounting member having an enlarged generally flat forward end portion disposed transversely of said styli, and said means to urge comprising a U-shaped resilient pad positioned about said enlarged end portion.

13. Apparatus according to claim 11 further characterized by said means to rotate comprising a rotatable control member having a longitudinally disposed recess therein, said recess having a non-cylindrical portion to receive said stylus mounting member, said stylus mounting member having a non-cylindrical forward end portion, and resilient means in said recess interposed between said control member and said stylus mounting member, said resilient means being normally deformed and comprising said means to urge.

14. Apparatus according to claim 11 further characterized by said driving member comprising a member of flat strip material, the major axis of said strip material being disposed generally in horizontal transverse relation to said stylus mounting member whereby to accurately transmit side-to-side movements of said styli to said piezoelectric element while substantially reducing transmission of vertical movements of said styli.

References Cited in the file of this patent

UNITED STATES PATENTS

| | | |
|---|---|---|
| 2,575,999 | Cordes | Nov. 20, 1951 |
| 2,653,191 | Palo et al. | Sept. 22, 1953 |